United States Patent
Basso et al.

(10) Patent No.: US 7,512,149 B2
(45) Date of Patent: Mar. 31, 2009

(54) BIT AND POWER ALLOCATION SCHEME FOR FULL-DUPLEX TRANSMISSION WITH ECHO CANCELLATION IN MULTICARRIER-BASED MODEMS

(75) Inventors: James Basso, Englishtown, NJ (US); Hamid R Sadjadpour, West Caldwell, NJ (US); Ranjan V Sonalkar, North Caldwell, NJ (US)

(73) Assignee: AT & T Intellectual Property II, L.P., Reno, NV (US)

( * ) Notice: Subject to any disclaimer, the term of this patent is extended or adjusted under 35 U.S.C. 154(b) by 691 days.

(21) Appl. No.: 10/421,190

(22) Filed: Apr. 23, 2003

(65) Prior Publication Data

US 2004/0213293 A1  Oct. 28, 2004

(51) Int. Cl.
H04J 3/16 (2006.01)
H04J 3/22 (2006.01)
H04B 1/38 (2006.01)
H04L 5/16 (2006.01)

(52) U.S. Cl. ........................ 370/465; 375/222; 375/260
(58) Field of Classification Search ................. 370/465, 370/468, 480; 375/222, 260
See application file for complete search history.

(56) References Cited

U.S. PATENT DOCUMENTS

| | | | |
|---|---|---|---|
| 4,467,441 A | 8/1984 | Gritton | |
| 4,554,417 A | 11/1985 | Boyer | |
| 4,574,166 A | 3/1986 | Gritton | |
| 4,591,669 A | 5/1986 | Duttweiler et al. | |
| 4,628,157 A | 12/1986 | Chance et al. | |
| 4,679,227 A | 7/1987 | Hughes-Hartogs | |
| 4,731,834 A | 3/1988 | Duttweiler et al. | |
| 4,736,414 A | 4/1988 | Montagna et al. | |
| 5,001,701 A | 3/1991 | Gay | |
| 5,289,459 A | 2/1994 | Brownlie | |
| 5,289,539 A | 2/1994 | Maruyama | |
| 5,500,880 A | 3/1996 | Kellermann | |
| 5,519,731 A | 5/1996 | Cioffi | |
| 5,539,777 A | 7/1996 | Grube et al. | |
| 5,548,642 A | 8/1996 | Diethorn | |
| 5,557,612 A | 9/1996 | Bingham | |
| 5,566,167 A | 10/1996 | Duttweiler | |
| 5,572,527 A | 11/1996 | Still et al. | |
| 5,576,664 A | 11/1996 | Herold et al. | |
| 5,577,027 A | 11/1996 | Cheng | |
| 5,594,719 A | 1/1997 | Oh et al. | |

(Continued)

OTHER PUBLICATIONS

Sonalkar R. and Shively R., "An Efficient Bit Loading Algorithm for DMT Applications." Globecom '98, Sydney, Australia, Nov. 1998, 2683-2688.

(Continued)

*Primary Examiner*—Kevin C Harper

(57) ABSTRACT

The present invention provides a method, data modulator, modem, computer readable medium and system for allocating bits to sub-carriers of data channel frequencies for spectrally efficient full-duplex transmission. Bits are allocated successively to a plurality of sub-carriers for a data channel based on minimal power consumption, a power mask for each sub-carrier, a bit capacity of each sub-carrier, and a predetermined data rate. Allocation of bits is ceased when at least one of: a predetermined total power budget has been substantially exhausted, power masks for the plurality of sub-carriers have been substantially exhausted, bit capacities for the plurality of sub-carriers have been substantially exhausted, and the predetermined data rate has been reached.

14 Claims, 8 Drawing Sheets

U.S. PATENT DOCUMENTS

| | | |
|---|---|---|
| 5,606,577 A | 2/1997 | Grube et al. |
| 5,608,725 A | 3/1997 | Grube et al. |
| 5,610,909 A | 3/1997 | Shaw |
| 5,623,513 A | 4/1997 | Chow et al. |
| 5,625,651 A | 4/1997 | Cioffi |
| 5,631,899 A | 5/1997 | Duttweiler |
| 5,640,387 A | 6/1997 | Takahashi et al. |
| 5,644,573 A | 7/1997 | Bingham et al. |
| 5,659,609 A | 8/1997 | Koizumi et al. |
| 5,663,982 A | 9/1997 | Hodge et al. |
| 5,668,802 A | 9/1997 | Chalmers et al. |
| 5,668,865 A | 9/1997 | Duttweiler et al. |
| 5,673,290 A | 9/1997 | Cioffi |
| 5,682,378 A | 10/1997 | Betts et al. |
| 5,682,385 A | 10/1997 | Garcia et al. |
| 5,724,393 A | 3/1998 | Dagdeviren |
| 5,742,527 A | 4/1998 | Rybicki et al. |
| 5,752,229 A | 5/1998 | Duttweiler et al. |
| 5,781,728 A | 7/1998 | Rybicki et al. |
| 5,787,113 A | 7/1998 | Chow et al. |
| 5,790,632 A | 8/1998 | Antonio et al. |
| 5,832,387 A | 11/1998 | Bae et al. |
| 5,852,633 A | 12/1998 | Levin et al. |
| 6,005,893 A | 12/1999 | Hyll |
| 6,075,821 A | 6/2000 | Kao et al. |
| 6,084,917 A | 7/2000 | Kao et al. |
| 6,122,247 A | 9/2000 | Levin et al. |
| 6,134,274 A | 10/2000 | Sankaranarayanan et al. |
| 6,144,696 A | 11/2000 | Shively et al. |
| 6,169,723 B1 | 1/2001 | Fertner et al. |
| 6,205,410 B1 | 3/2001 | Cai |
| 6,249,543 B1 * | 6/2001 | Chow .................. 375/219 |
| 6,259,746 B1 | 7/2001 | Levin et al. |
| 6,393,052 B2 * | 5/2002 | Sadjadpour et al. ......... 375/222 |
| 6,424,646 B1 | 7/2002 | Gerszberg et al. |
| 6,459,678 B1 * | 10/2002 | Herzberg .................. 370/203 |
| 6,580,727 B1 * | 6/2003 | Yim et al. .................. 370/463 |
| 7,190,715 B1 * | 3/2007 | McTague et al. ............. 375/222 |
| 2003/0081763 A1 * | 5/2003 | Tang et al. ............. 379/406.01 |
| 2003/0118177 A1 * | 6/2003 | Karakas et al. ......... 379/406.01 |

OTHER PUBLICATIONS

J.C. Tu and J.M. Cioffi, "A loading algorithm for the Concantenation of Coset Codes with Multi-channel Modulation Methods," IEEE Globecom 1990, p. 1183-1187.

Peter S. Chow, John Cioffi and John A.S. Bingham, "A Practical Discrete Multitone Transceiver Loading Algorithm for Data Transmission over Spectrally Shaped Chanells," IEEE Transactions on Communications. vol. 43, No. 2/3/4, Feb./Mar./Apr. 1995, p. 773-775.

L.M.C. Hoo, J. Tellado and J.M. Cioffi, "Dual Qos loading Algorithms for DMT Systems Offering CBR and VBR Services," Globecome 98, Sydney Australia, Nov. 1998, p. 25-30.

B.S. Krongold, K. Ramchandran and D.L. Jones, "Computationally Efficient Optimal Power Allocation Algorithm for Multicarrier Communication Systems," ICC 1998, vol. 2, p. 1018-1022.

John A.C. Bingham, "Multicarrier Modulation for Data Transmission: An Idea Whose Time has Come," IEEE Communications magazine, May 1990, p. 5-14.

\* cited by examiner

BIT AND POWER ALLOCATION SCHEME FOR FULL-DUPLEX TRANSMISSION WITH ECHO CANCELLATION IN MULTICARRIER-BASED MODEMS

RELATED APPLICATION

This application claims priority under 35 U.S.C. Section 119(e) based on provisional application U.S. Ser. No. 60/126,035, entitled "A Bit Allocation Algorithm For Full-Duplex Transmission With Echo Cancellation In DMT-based DSL Modems," filed on Mar. 25, 1999, by inventors Ranjan Sonalkar, James Basso and Hamid Sadjadpour.

FIELD OF THE INVENTION

The present invention relates to full-duplex transmission of signals in a multicarrier-based modem system and, more particularly, to a method and system for allocating information bits to the individual carriers when the system must use echo cancellation for mitigating the effect of leakage of the signals transmitted in the frequency band of the received signals.

BACKGROUND

Typically, in a telephone network a hybrid converter connects the unidirectional four-wire link from the public switched telephone network (PSTN) to the local two-wire loop. The hybrid converter separates the transmitted signal originating in the local loop from the received signal in the four-wire link from the PSTN, and the transmitted signal in the PSTN from the received signal in the local loop. Since there is an impedance mismatch in the hybrid converter, part of the received energy of a signal is reflected back to the transmitting port, causing a speaker to hear his own delayed speech, i.e., an electrical echo. A second type of echo is caused when a speech signal generated from a speaker at a terminal propagates in the form of an acoustic wave through an acoustic environment and part of it is captured by the microphone of the terminal. When the acoustic wave is transmitted back to the speaker, it is called an acoustic echo. To suppress echoes, typically a suppressor switch monitors the voice signals travelling in both directions. The switch detects which person is talking and blocks the signal traveling in the opposite direction. Such suppressor switches may terminate speech signals too quickly when the speakers speak fast, thus causing some speech information to be lost when the suppressor switch does not switch fast enough. Of course, when speakers speak simultaneously, the suppressor switch is ineffective. When communication is implemented in a multicarrier-based modulation system having Digital Subscriber Loops (DSLs), data bits need to be allocated to form Quadrature Amplitude Modulation (QAM) consistent with the American National Standards Institute (ANSI) while optimizing data transmission capacity within the constraints of the limited power budget and power mask constraint specified by ANSI. ANSI is an organization that coordinates, develops, and publishes standards for use in the United States.

While the ANSI standard for Asynchronous Digital Subscriber Loops (ADSL) permits Discrete Multitone (DMT) modulation in full-duplex transmission mode over a limited bandwidth, most modems do not use full-duplex transmission. Apparently, no scheme has been designed to spectrally allocate data bits under the above conditions and the literature does not include descriptions of any such efforts. The ANSI standard permits duplex transmission, that is, transmitting and receiving data over the same bandwidth over the same pair of wires, which is possible by the use of an analog hybrid circuit that isolates the transmitted signal from the incoming received signal. The hybrid can yield isolation of 15-20 dB. In other words, the transmitted signal that leaks into the received signal is attenuated by about 15-20 dB from its transmitted power level. The received data, however, has been attenuated by the channel between the remote transmitter and the receiver. Therefore, the signal transmitted by the remote transmitter can be attenuated to a much higher degree as it reaches the remote receiver. For a 3,000 ft. wire, the attenuation increases to −20 dB over the 1 MHz bandwidth that is used by an asymmetric digital subscriber loop (ADSL) modem. For a 18,000 ft. wire, the attenuation can be as much as −140 dB. Thus, the received signal is generally of much lower power than the leakage signal. The contamination by the leakage signal must be reduced by the implementation of an Echo Canceler (EC). Since the EC cannot completely cancel the leakage, the residual leakage acts as receiver noise and reduces the signal-to-noise ratio (SNR) of the received signal. This leakage signal is generally not measured, and it adds to the noise power that is measured during the initialization period of the modem.

All multicarrier DSL modems require a scheme to allocate data bits among the frequency bins (subcarriers) of each complex transmission symbol. Any such scheme uses the channel attenuation characteristics and the measured noise background as inputs and provides a distribution of data bits across frequency bins as the output. Some schemes described in the prior art use a variation of an approach often referred to as the 'water filling' approach. These schemes consider the limitation of total power as the primary constraint within which the bit allocation must be determined. The constraints of minimum and maximum number of bits per bin and power spectral mask are not considered. Other schemes in the prior art can be used to determine the bit allocation subject to all such practical constraints. However, none of the prior art schemes perform optimal allocation if full-duplex transmission is desired.

Thus, there is a need for a symmetric DSL modem that efficiently allocates data bits to subcarriers for full-duplex transmission mode to overcome the limitations cited above.

SUMMARY OF THE INVENTION

The bit allocation method and system of the present invention is utilized by duplex multicarrier digital subscriber loop (DSL) modems that operate by measuring both the noise background, and echo canceler performance, and then use that information to perform bit and power allocation for full or partial frequency band duplex transmission.

The method and system of the present invention jointly allocate the bits for data transmission by the Central Office (CO) and the Remote Terminal (RT) on a per carrier basis.

The method and system of the present invention allocate the power for data transmission by jointly minimizing the total power transmitted by the CO and the RT.

The method and system of the present invention allocate the power for data transmission by jointly minimizing the weighted sum of the powers transmitted by the CO and RT.

DETAILED DESCRIPTION OF PREFERRED EMBODIMENTS

Figure 1:
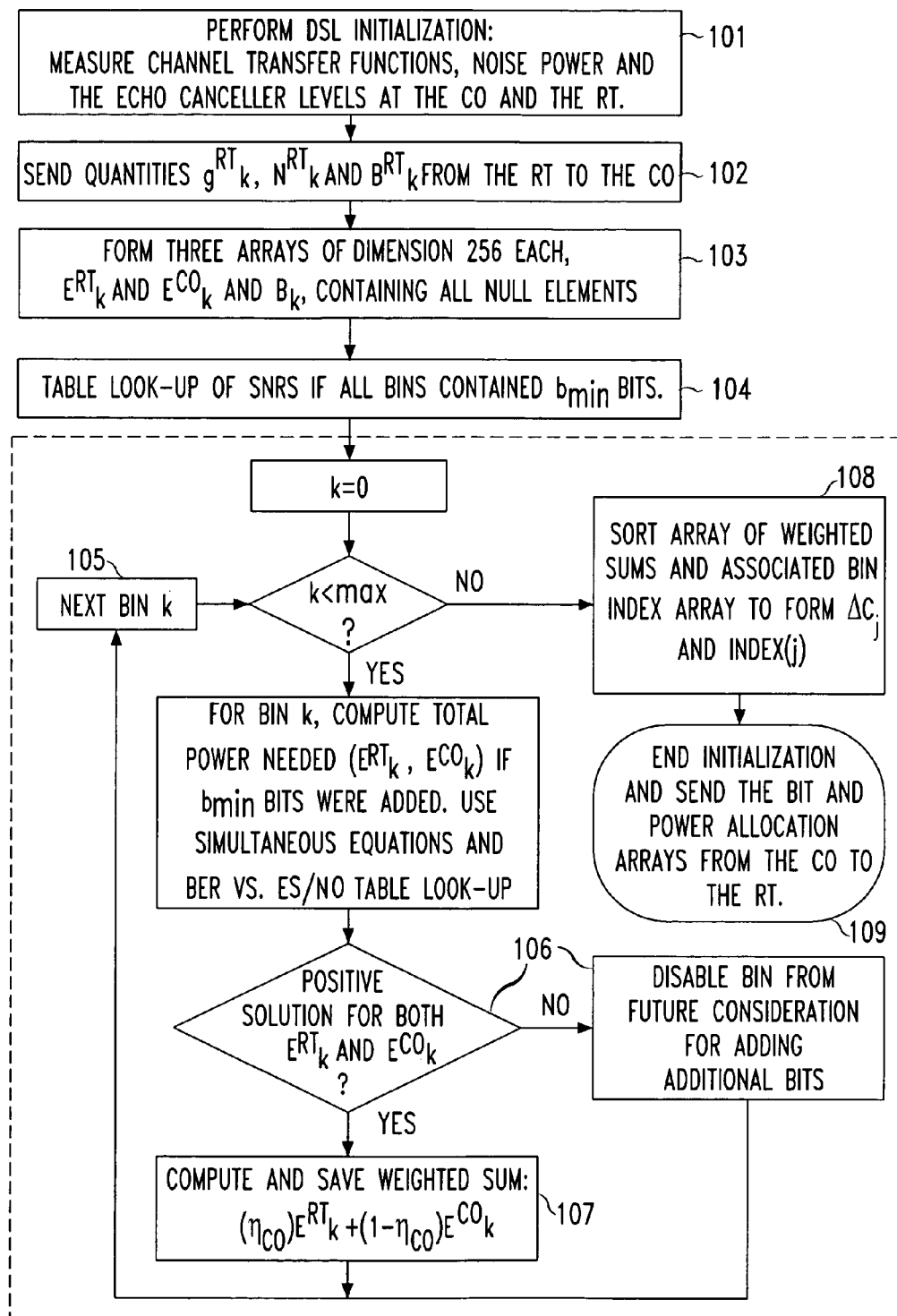
FIG. 1 is a flowchart showing one embodiment of steps of the initialization process of the bit and power allocation scheme of the present invention.

The present invention provides a spectrally efficient method and system for transmitting information, using multicarrier DSL modems that use multicarrier modulation technology and that are designed to communicate over attenuation-limited channels in a full-duplex mode, to subscribers in a local access loop. Implementation of full-duplex capability is crucial for telecommuting applications and in situations where high data rates are required for both upstream and downstream data transmission. The symmetric duplex capability will thus remove the constraint of asymmetric data transmission that is sufficient for most Web-surfing applications, but does not provide for high, two-way data rates.

The present invention provides a bit allocation scheme that distributes power across the transmission frequency band, subject to four primary constraints:

1) A limited power budget, specified to be 100 mWatts by the ANSI Standard;
2) Energy being divided between a plurality of bins, and a maximum power to be transmitted in each bin, generally referred to as a power spectrum mask;
3) Minimum and maximum number of bits (equivalently the constellation dimension) in a frequency bin (subcarrier) based on practical tolerance limits; and
4) The requested data rate (generally in Kbps).

The optimal distribution of power is made for the desired bit error rate (BER) at the receiver, and the allocation scheme compensates for the increasing signal attenuation with frequency and for the variation of the noise background with frequency while satisfying the four constraints and providing for full-duplex transmission.

The scheme of the present invention uses as its input data three quantities that are measured during the initialization of the subject modem:

1) The channel transfer functions from the Central Office (CO) to the Remote Terminal (RT) and from the RT to the CO, assuming a non-symmetric channel for generality;
2) The noise background at the CO and the RT, assuming different backgrounds at the two ends of the transmission link; and
3) The effective amount of echo cancellation (including the attenuation effect of the analog hybrid circuit) at the CO and the RT, assuming non-identical hybrid circuits and different levels of cancellation at the two ends of the transmission link.

The quantities listed above are functions of frequency and, in general, each is a 256-dimensional vector, in which each element corresponds to a frequency that increases from 0 to 1.104 MHz in steps of 4.3125 kHz. The scheme calculates two new 256 dimensional vectors, each element of which contains the power needed to add one additional bit (or a predetermined $b_{min}$ bits for the initialization of the algorithm) to the bin corresponding to the vector index. A usable predetermined $b_{min}$ bits is 1. One vector is calculated for the CO side and the other for the RT side. A weighted sum of the two vectors is formed and sorted in the order of increasing power. Then, a bit (or $b_{min}$ bits if no bits are currently allocated to that bin) is added in the bin that requires the least amount of power. The element of the vector corresponding to the bin in which the bits are added is modified to be the power that would be needed for an additional bit to be added, and the vector is resorted in the order of increasing power. This process of adding power is continued recursively while checking all of the above four constraints before performing each step of incrementing the power and data bits. The allocation scheme ends when either one of the following conditions is met:

1) All the power budget is exhausted; or
2) The desired data rate is reached; or
3) If no more allocation can be made without violating any of the constraints.

The DSL technology of the present invention maximizes the data throughput on twisted pairs of copper wires in the presence of background noise, time-varying Far End Crosstalk (FEXT) and Near End Cross-talk (NEXT). The transmitter sends a known pseudo-random noise (PRN) sequence during the initial channel SNR estimation phase. The receiver computes the channel using the received signal and a stored replica of the transmitted PN sequence. The characteristics are computed in the form of a ratio, $$\frac{N_k}{g_k},$$

where $g_k$ is the channel gain ($|H(k)|^2$ or the inverse of the attenuation) in frequency band k, and $N_k$ is the noise power in band k. Determining the power distribution across the full frequency bandwidth for maximum data throughput is known in the art and will not be described further here. The optimum approach for additive white Gaussian noise (AWGN) has been proven to be the water filling algorithm of power distribution, where the $$\frac{N_k}{g_k}$$

profile is considered to be analogous to a terrain, and the available power budget is considered to be analogous to water that is poured on the terrain. In the water filling analogy, the water depth is equivalent to the power spectral density. However, the water pouring analogy is inappropriate when power must be allocated on digital channels intended for transmission of information in bits.

In one implementation in the prior art, the strategy of filling frequency bins with data bits, one bit at a time, is employed. A bit is added to any particular bin that is the least expensive bit in terms of the additional power needed for the resulting signal constellation to be received at the acceptable BER. The filling with bits is continued until a limited power budget is used up. In this process, the power is added to each bin in discrete amounts that correspond to the power needed to add an integer number of bits; thus, rather than water filling, the scheme of the present invention utilizes ice cube filling.

For duplex transmission, the initialization phase must perform the additional measurement of the residual leakage through the hybrid converter circuit and the EC after the EC has adapted to the echo channel. This measurement can be implemented during each channel estimation phase when one end is transmitting the PRN signal and the other end is silent while collecting data. During this phase, the transmitter end may also be operating the EC and then measuring the total cancellation (due to both the hybrid attenuation and the echo canceler) achieved as a function of frequency. This EC transfer function is denoted as $B_k$ analogous to the channel gain $g_k$. Optimal bit and power allocation for duplex transmission for the desired BER may be calculated using these measured quantities for each of the two ends; namely the channel transfer function, $g_k$, the background noise power, $N_k$, and the echo channel transfer gain after EC convergence, $B_k$.

The following terms are defined in order to describe the steps of the method of the bit allocation initialization process and the bit allocation scheme iterations for implementing the present invention.

TABLE 1

Definitions of symbols used in the description

| | | |
|---|---|---|
| $b_{max}$ | ≜ | Maximum no. of bits in one bin |
| $b_{min}$ | ≜ | Minimum no. of bits in one bin (except when there is no data assigned to a bin) |
| $G_c$ | ≜ | Coding gain factor |
| $b_k$ | ≜ | No. of bits in bin no. k |
| P_mask$_k$ | ≜ | Power spectrum mask at bin k |
| Superscript i = CO or RT | ≜ | CO refers to the Central Office end, and RT refers to the Remote Terminal end. |
| $P^i_{total}$ | ≜ | Total energy allocated at end i |
| $P_{budget}$ | ≜ | Total power budget (100 mWatts) |
| $P^i_{res}$ | ≜ | Residual power at end i = P_budget − P$_{total}$ |
| $E^i_k$ | ≜ | Total power in bin k, at end i, needed to transmit $b_k$ bits |
| $\Delta E^i_k$ | ≜ | Incremental power in bin no. k at end i needed to transmit an additional bit (above current value of $b_k$). |
| $\Delta C_j$ | ≜ | Sorted incremental power cost. |
| $g^i_k$ | ≜ | Channel power attenuation factor in frequency bin k at end i measured during the initialization |
| $H^i_k$ | ≜ | Echo channel power attenuation factor (including the effects of the hybrid and the echo canceler) in frequency bin k at end i measured during initialization |
| $N^i k$ | ≜ | Noise power in frequency bin k at end i measured during initialization |

Bit allocation initialization, as shown in FIG. 1, includes the following steps:

1. (101) Perform DSL initialization process at both ends according to a predetermined procedure that allows the measurement of the channel transfer functions, the echo channel transfer functions (including cancellation factor) and the background noise powers at the CO and the RT ends. The predetermined procedure may be any such DSL initialization process known in the art.

2. (102) After the initialization process is complete, the RT sends its three measured vector quantities, $g^{RT}_k$, $N^{RT}_k$ and $B^{RT}_k$, to the CO for the subsequent bit and power allocation scheme that is to be implemented by the CO. (For generality, assume that the RT and CO operate at different bit error rates and the following steps are executed on the processor at the CO.)

3. (103) Form three arrays, $E^{RT}_k$ and $E^{CO}_k$ and $B_K$, containing all null elements, to maintain the cumulative transmit power at RT and the CO and the number of bits in each sub-carrier, k.

4. (104) Calculate the SNRs needed to operate at the needed BERs, $S^{RT}_k$ and $S^{CO}_k$ in all the 256 frequency bins, k=1 . . . 256. In order to compute the SNRs, use the constellation size as determined by the minimum number of bits allowed in each bin, $b_{min}$. Usually, some coding is used; hence the SNR calculation will be a table look-up operation.

5. (105) Calculate hypothetical power arrays $E^{CO}_k$ and $E^{RT}_k$ by solving the following two linear equations:

$$\frac{g^{RT}_k \cdot E^{CO}_k}{\beta^{RT}_k \cdot E^{RT}_k + N^{RT}_k} = S^{RT}_k \quad \text{and} \quad \frac{g^{CO}_k \cdot E^{RT}_k}{\beta^{CO}_k \cdot E^{CO}_k + N^{CO}_k} = S^{CO}_k$$

for all frequency bins. The first equation represents the SNR observed at the RT and the second equation represents the SNR observed at the CO.

6. (106) When solving these equations, it is necessary to verify that the solutions for $E^{RT}_k$ and $E^{CO}_k$ are both positive (and therefore a valid solution). If not, these bins should be disabled from further consideration for bit allocation.

7. (107) For each bin k, form a weighted sum equal to ($\eta_{CO}$) $E^{RT}_k + (1-\eta_{CO})E^{CO}_k$ with weight $\eta_{CO}$ which is equal to ½ if both sides are to be weighted equally. In most cases, the CO has more wires coming together in the cable bundle; hence the NEXT problem is expected to be greater at the CO. In order to control the NEXT at the CO, one may wish to set $\eta_{CO}$ to be greater than ½, so that greater weight will be placed on reducing the transmitted power at the CO by the subsequent power minimization algorithm.

8. (108) Sort the array of weighted sums in ascending order to form power cost array, $\Delta C_j$, such that the bin element with j=1 corresponds to the bin that would cost the least in power if one bit is added to that bin both at the CO and the RT. At the same time store the bin indices of the sorted array in another array called INDEX, so that the elements of INDEX are the sorted indices. For example, INDEX(1) =the bin index $k_{min}$ at which the weighted sum is minimum.

9. (109) End of initialization and start of bit/power allocation process.

Figure 2:
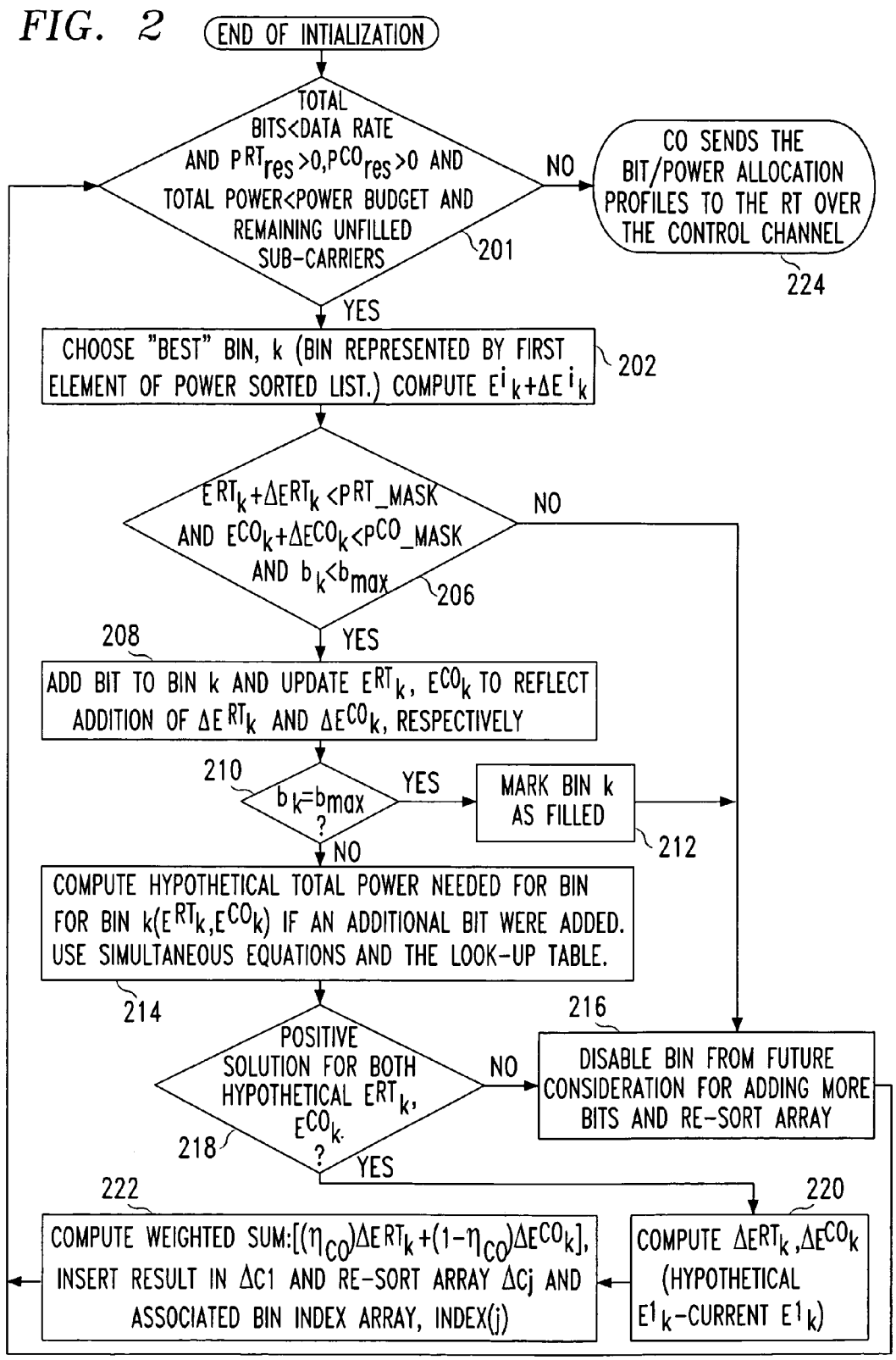
FIG. 2 is a flowchart of one embodiment of steps of the method for allocating data bits and power for DSL modems that use the DMT technology and symmetrical transmission data rates in full-duplex mode with the use of Echo Cancellation in accordance with the present invention.

After initialization as shown in FIG. 1 is completed, the method/scheme of the present invention is implemented, as shown in FIG. 2, to allocate data bits to subcarriers to optimize data bit transmission within the constraints of the limited power budget and power mask constraint specified by ANSI standard. The steps of the method include the following:

1. (201) Check if the total power allocated at either of the two ends equals the power budget. Check if the total number of bits allocated is equal to the number of bits in one frame that would result in the desired data rate (i.e., Number of bits in one DSL frame=desired data rate in Mbps/4000). If either of these conditions is satisfied or if there are no remaining sub-carriers enabled for bit allocation, then the bit allocation algorithm is finished and go to step 0; otherwise, continue as follows.

2. (202) First bin in the sorted array INDEX represents the bin that requires the least amount of power for adding 1 more bit. Compute the power needed to transmit the additional bit in bin k.
3. (206) Add $\Delta E^{RT}_k$ and $\Delta E^{CO}_k$, respectively, to $E^{RT}_k$ and $E^{CO}_k$ where k-INDEX(1). Check if $E^{RT}_k$ and $E^{CO}_k$ exceed the corresponding power masks at CO and RT. Check if the number of bits ($b_k$) in bin k=INDEX(1) is less than $b_{max}$. If any one or more of these conditions is met then go to step 4; otherwise go to step 7.
4. (208) Add one bit to bin k and update $E^{RT}_k$ and $E^{CO}_k$ to reflect the additional power.
5. (210) If $b_k$ equals $b_{max}$, then mark the bin as filled (212) and go to step 7.
6. (214) Calculate hypothetical power needed for bin k for one additional bit at the CO and the RT, $E^{RT}_k$ and $E^{CO}_k$, using the simultaneous equations and the table look-up for the required SNRs. Go to step 8.
7. (216) Disable bin from future consideration for adding more bits. The new bin number INDEX(1) is once again the bin that would require the least amount of power for adding the next bit. Go to step 1.
8. (218) If $E^{RT}_k$ and $E^{CO}_k$ both are positive solutions, then go to step 9; otherwise go to step 7.
9. (220) Calculate $\Delta E^{RT}_k$ and $\Delta E^{CO}_k$ (for k=INDEX(1)) by taking the difference between the hypothetical values of $E^{RT}_k$ and $E^{CO}_k$ for ($b_k$+1) bits minus the actual current $E^{RT}_k$ and $E^{CO}_k$ (for $b_k$ bits).
10. (222) Calculate the additional weighted power cost of one more bit in bin number, k=INDEX(1). The additional weighted power cost is $(\eta_{CO})\Delta E^{RT}_k+(1-\eta_{CO})\Delta E^{CO}_k$. Insert the value of the additional weighted power into the first element of the sorted array $\Delta C_j$. Re-sort array $\Delta C_j$ in order of increasing incremental power and form the corresponding array of sorted indices INDEX(j). Go back to first step 1 (201).
11. (224) After the allocation process is completed by the initialization processor at the CO, the CO must construct a message concerning the 'frequency versus bits' and the 'frequency versus power' distribution profiles to the RT, to enable the RT to construct the DMT symbols for subsequent data transmission.

Since the algorithm described above constructs identical bit allocation profiles for both the RT and the CO, it is not necessary to send the CO's bit allocation profile separately to the RT.

Figure 3:
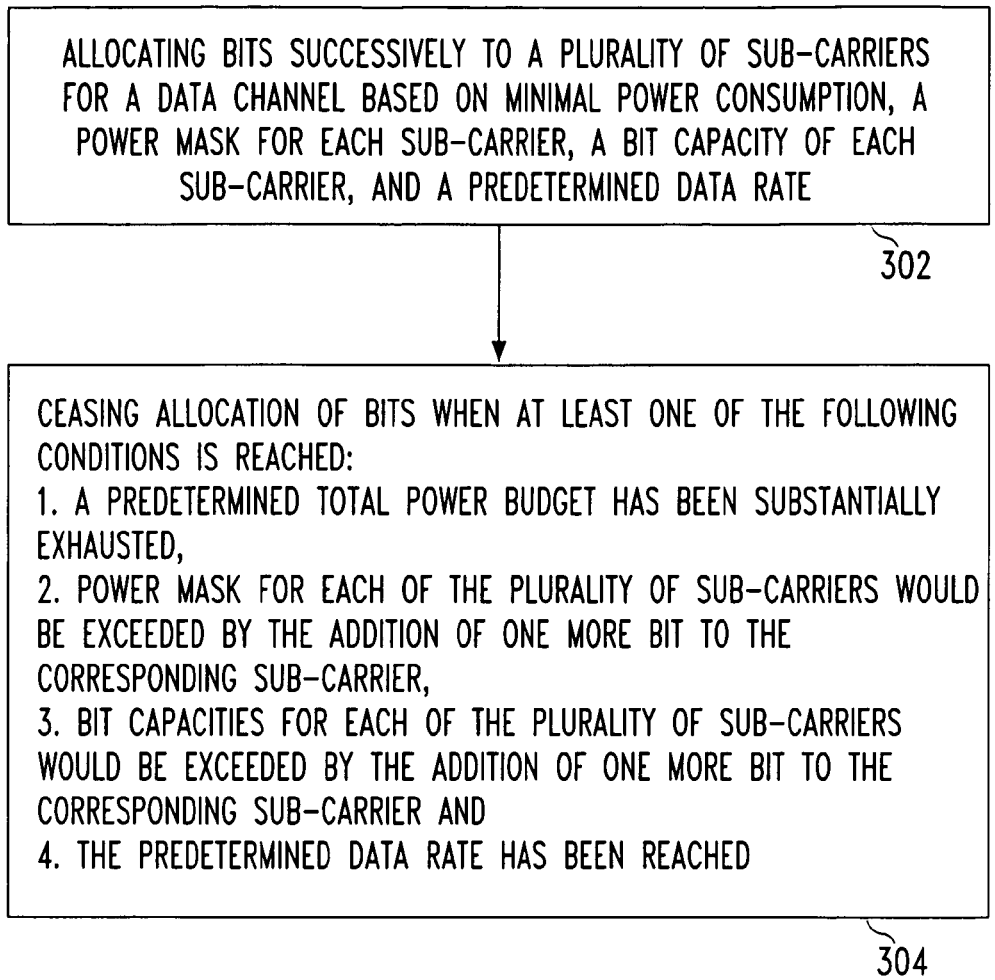
FIG. 3 shows another embodiment of steps in accordance with the method of the present invention.

FIG. 3 shows another embodiment of steps of a method in accordance with the present invention. The method provides for allocating bits to sub-carriers of data channel frequencies for spectrally efficient full-duplex transmission and includes the steps of: (302) allocating bits successively to a plurality of sub-carriers for a data channel based on minimal power consumption, a power mask for each sub-carrier, a bit capacity of each sub-carrier, and a predetermined data rate; and ceasing (304) allocation of bits when at least one of: a predetermined total power budget has been substantially exhausted, power masks for the plurality of sub-carriers have been substantially exhausted, bit capacities for the plurality of sub-carriers have been substantially exhausted, and the predetermined data rate has been reached. Where selected, allocating bits successively to the plurality of sub-carriers based on minimal power consumption includes allocating a bit to an available sub-carrier having a lowest power requirement. Alternatively, allocating bits successively to the plurality of sub-carriers based on the power mask for each sub-carrier may include allocating a bit to a sub-carrier when a total power utilized for the sub-carrier upon allocation of the bit fails to exceed the power mask for the sub-carrier.

Also, allocating bits successively to the plurality of sub-carriers based on a bit capacity of each sub-carrier may include allocating bits to each sub-carrier based on a maximum number of bits and a minimum number of bits for each sub-carrier. Ceasing allocation of bits when the predetermined total power budget has been substantially exhausted may include calculating a total power level utilized as bits are allocated; comparing the total power level utilized to the predetermined total power budget; and ceasing allocation of bits where a total power level utilized by bits allocated is less than the predetermined total power budget if allocation of another bit to a sub-carrier provides a total power level utilized by bits allocated that is greater than the predetermined total power budget. The power mask of each of the plurality of sub-carriers is typically a predetermined maximum power to be transmitted by the sub-carrier. For example, 256 sub-carriers may be utilized.

Figure 4:
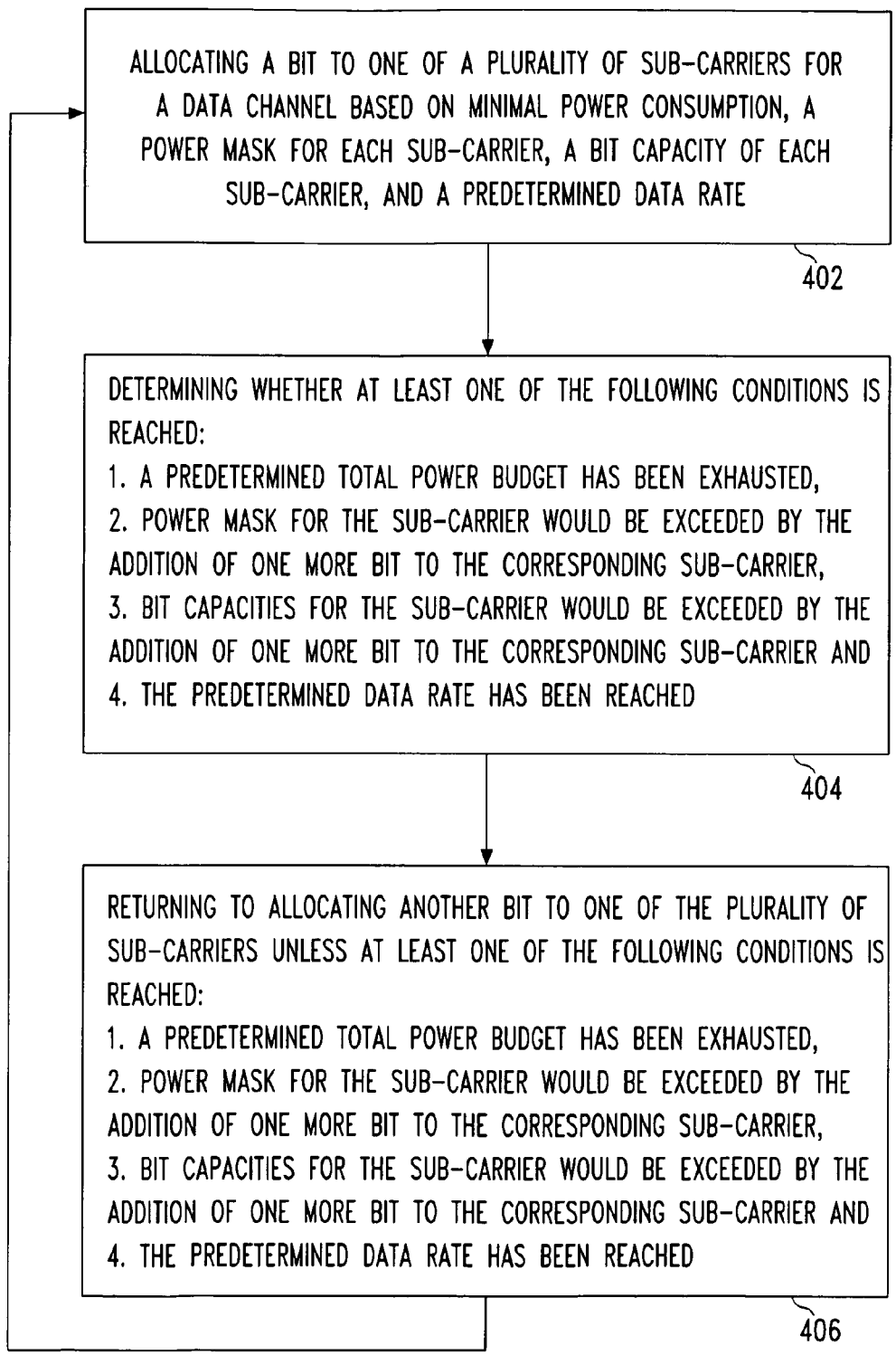
FIG. 4 shows another embodiment of steps in accordance with the method of the present invention.

FIG. 4 shows another embodiment of steps in accordance with the method of the present invention. The method allocates bits to provide spectrally efficient transmission of information bits in a full-duplex mode using a local access loop and includes the steps of: allocating (402) a bit to one of a plurality of sub-carriers for a data channel based on minimal power consumption, a power mask for each sub-carrier, a bit capacity of each sub-carrier, and a predetermined data rate; determining (404) whether: a predetermined total power budget has been substantially exhausted, power masks for the plurality of sub-carriers have been substantially exhausted, bit capacities for the plurality of sub-carriers have been substantially exhausted, and the predetermined data rate has been reached; and returning (406) to allocating another bit to one of the plurality of sub-carriers unless at least one of: the predetermined total power budget has been substantially exhausted, power masks for the plurality of sub-carriers have been substantially exhausted, bit capacities for the plurality of sub-carriers have been substantially exhausted, or the predetermined data rate has been reached. Allocating bits, ceasing allocation of bits and provision of the power mask are typically accomplished in a manner described above.

Figure 5:
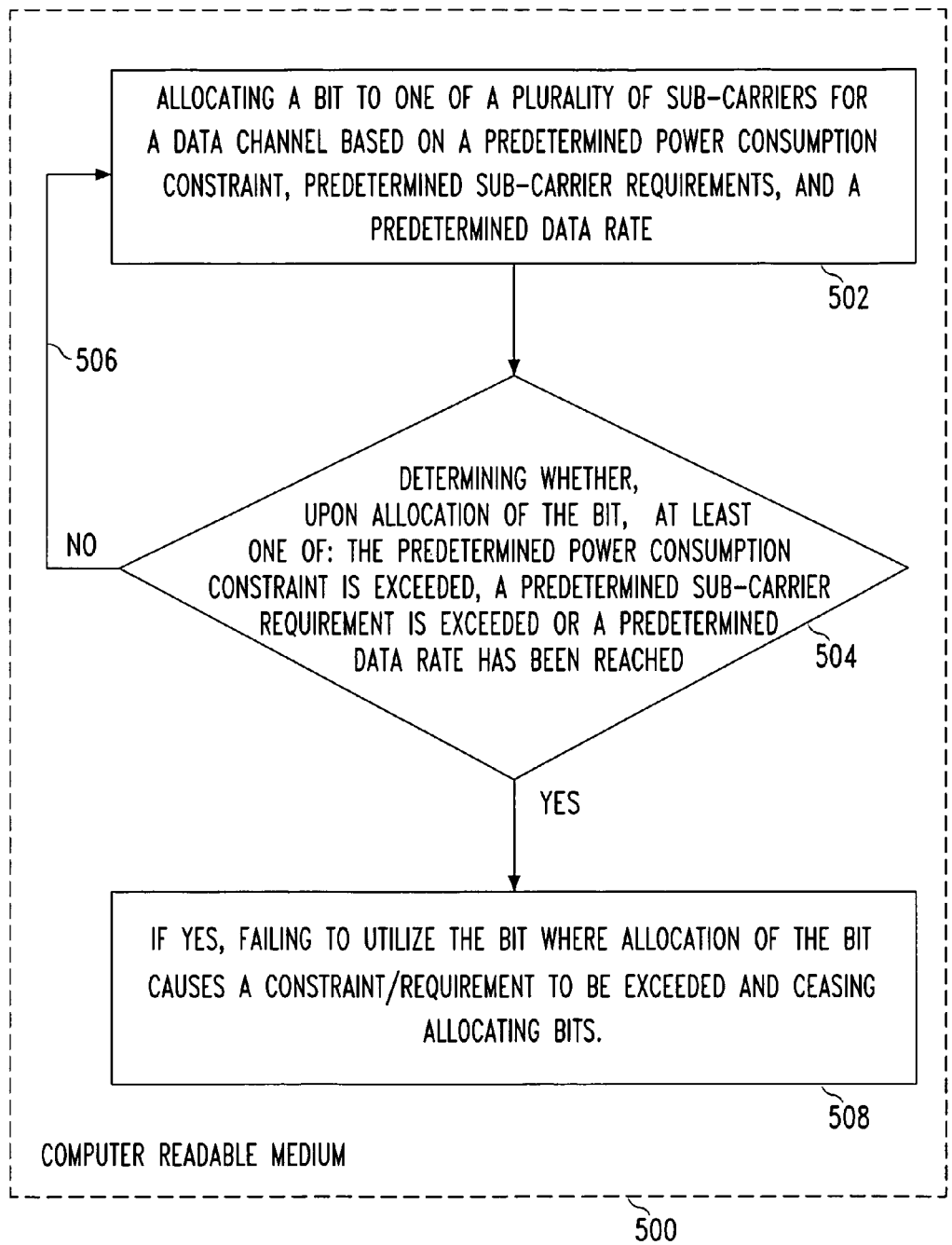
FIG. 5 shows another embodiment of steps in accordance with the method of the present invention and shows a schematic representation of a computer readable medium for implementing one embodiment of the method of the present invention.

FIG. 5 shows another embodiment of steps in accordance with the method of the present invention and implementation in a computer-readable medium. The method and implementation in a computer-readable medium (500) provide for allocating bits to sub-carriers of data channel frequencies for spectrally efficient full-duplex transmission, using the steps of: allocating (502) a bit to one of a plurality of sub-carriers for a data channel based on a predetermined power consumption constraint, predetermined sub-carrier requirements, and a predetermined data rate, and determining (504) if, upon allocation of the bit, at least one of: the predetermined power consumption constraint is exceeded, a predetermined sub-carrier requirement is exceeded or a predetermined data rate has been reached; and if no, returning (506) to the step of allocating a bit, and if yes, failing (508) to utilize the bit where allocation of the bit causes a constraint or requirement to be exceeded and ceasing allocating bits. Allocating a bit to one of the plurality of sub-carriers based on a predetermined power consumption constraint generally includes allocating a bit to an available sub-carrier having a lowest power requirement. Allocating a bit to one of the plurality of sub-carriers based on predetermined sub-carrier requirements typically includes allocating bits to each sub-carrier based on a maximum number of bits and a minimum number of bits for each sub-carrier. Determining if, upon allocation of the bit, the predetermined power consumption constraint is exceeded generally includes calculating a total power level utilized upon allocation of the bit, and comparing the total power level utilized to a predetermined total power budget.

Determining if, upon allocation of the bit, a predetermined sub-carrier requirement is exceeded generally includes: determining if, upon allocation of the bit, a total power to be utilized by the sub-carrier for transmission exceeds a predetermined maximum power to be transmitted by the sub-carrier, and determining if, upon allocation of the bit, a number of bits for the sub-carrier fails to be within a range determined by a predetermined minimum number of bits and a predetermined maximum number of bits for the sub-carrier.

Figure 6:
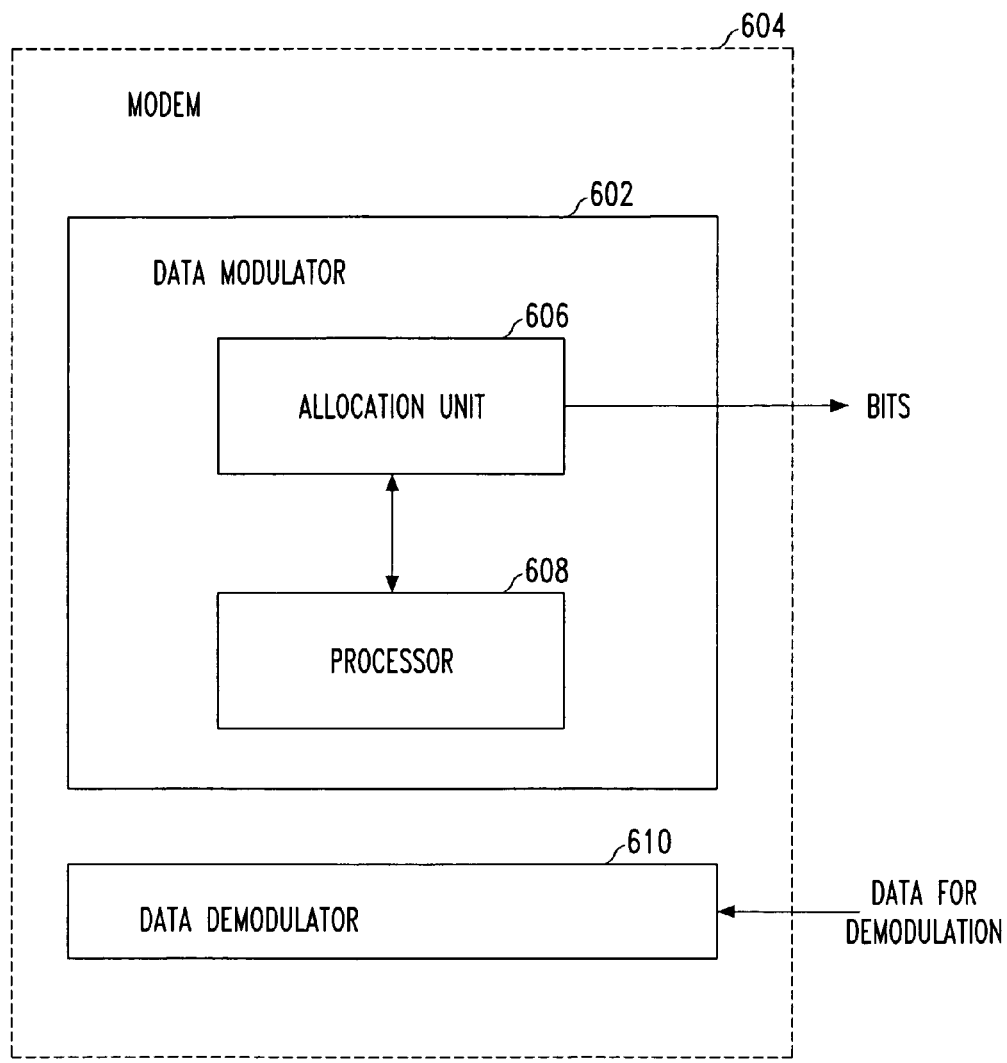
FIG. 6 is a block diagram of a data modulator in accordance with the present invention wherein the data modulator may be a component of a modem.

FIG. 6 is a block diagram of a data modulator in accordance with the present invention wherein the data modulator (602) may be a part of a modem (604). The data modulator (602), which may be a component of a modem (604), allocates bits to provide spectrally efficient transmission of information in a full-duplex mode using a local access loop. Typically, the data modulator (602) includes an allocation unit (606) and a processor (608). The allocation unit (606) allocates a bit to one of a plurality of sub-carriers for a data channel based on a predetermined power consumption constraint, predetermined sub-carrier requirements, and a predetermined data rate.

The processor (608) is coupled to the allocation unit (606) and determines if, upon allocation of the bit, at least one of: (A) the predetermined power consumption constraint is exceeded, (B) a predetermined sub-carrier requirement is exceeded or (C) a predetermined data rate has been reached. Where the processor (608) determines (A)-(C) fail to occur, the processor 608 signals the allocation unit (606) to allocate another bit. Where the processor (608) determines that allocation of the bit causes a constraint/requirement to be exceeded, the processor (608) signals the allocation unit to fail to utilize the bit and cease allocating bits. Where the processor (608) determines that the predetermined data rate has been reached, the processor (608) signals the allocation unit to cease allocating bits. The modem (604) typically also includes a data demodulator (610) for demodulating data.

Figure 7:
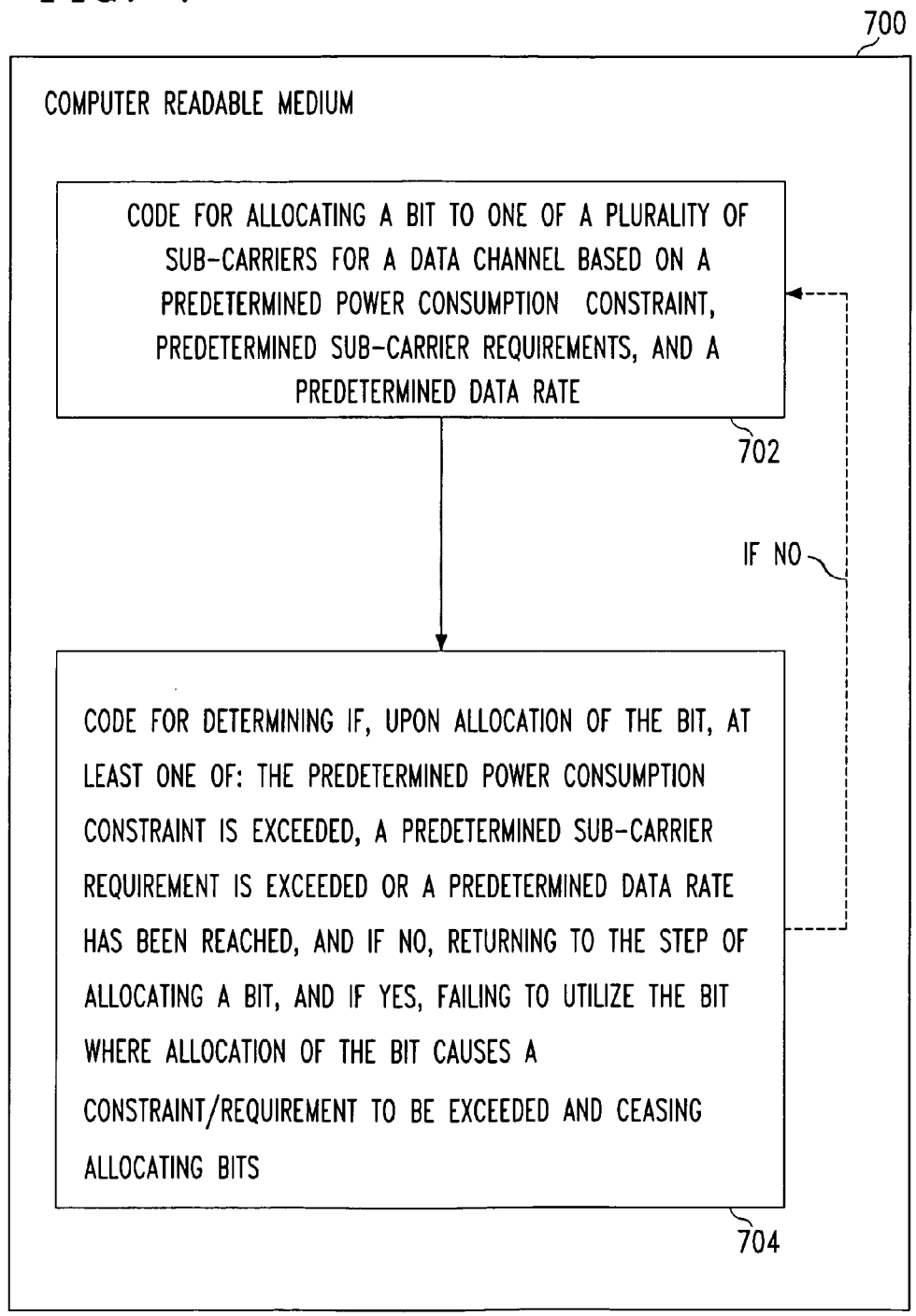
FIG. 7 is a block diagram of another embodiment of a computer-readable medium having computer-executable code stored thereon, wherein the computer-executable code allocates bits to provide spectrally efficient transmission of information in a full-duplex mode using a local access loop in accordance with the present invention.

FIGS. 5 and 7 show a schematic representation of a computer readable medium (500, 700) that stores computer-executable software code for optimally allocating data bits and power for transmission in a full-duplex mode for a digital subscriber loop modem using discrete multitone modulation in accordance with the present invention. A typical computer readable medium (500, 700) is a computer disk, a CD-ROM, a DVD, or the like. The computer-executable software code includes, as shown in FIG. 5, the steps of: allocating (502) a bit to one of a plurality of sub-carriers for a data channel based on a predetermined power consumption constraint, predetermined sub-carrier requirements, and a predetermined data rate; determining (504) if, upon allocation of the bit, at least one of: the predetermined power consumption constraint is exceeded, a predetermined sub-carrier requirement is exceeded or a predetermined data rate has been reached; and if no, returning 506 to the step of allocating a bit, and if yes, failing (508) to utilize the bit where allocation of the bit causes a constraint/requirement to be exceeded and ceasing allocating bits.

FIG. 7 is a block diagram of a computer-readable medium (700) having computer-executable code stored thereon, wherein the computer-executable code allocates bits to provide spectrally efficient transmission of information in a full-duplex mode using a local access loop in accordance with the present invention. The computer-executable code typically includes code (702) for allocating a bit to one of a plurality of sub-carriers for a data channel based on a predetermined power consumption constraint, predetermined sub-carrier requirements, and a predetermined data rate, and code (704) for determining if, upon allocation of the bit, at least one of: the predetermined power consumption constraint is exceeded, a predetermined sub-carrier requirement is exceeded or a predetermined data rate has been reached, and if no, returning to the step of allocating a bit, and if yes, failing to utilize the bit where allocation of the bit causes a constraint/requirement to be exceeded and ceasing allocating bits.

Figure 8:
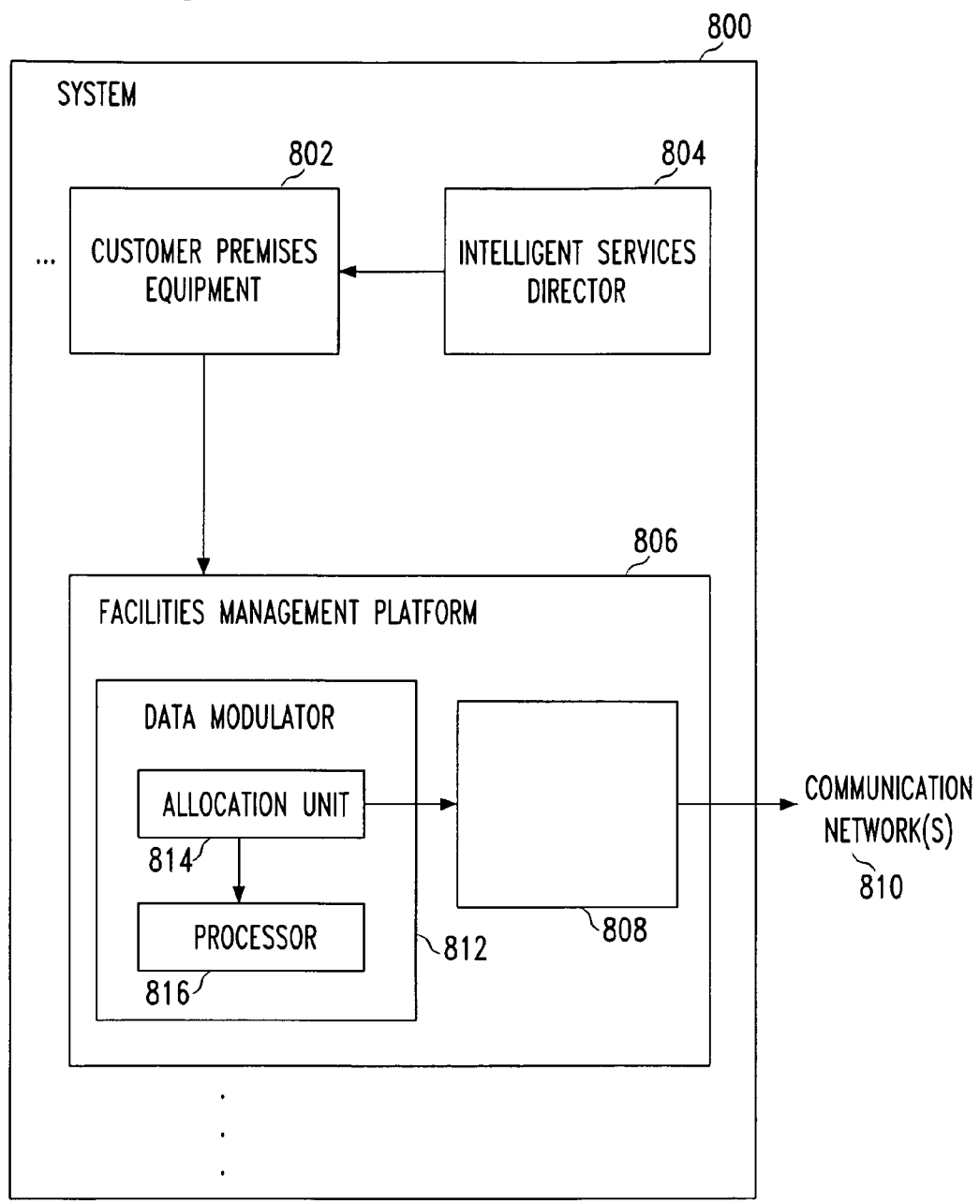
FIG. 8 is a block diagram of one embodiment of a system for allocating bits to provide spectrally efficient transmission of information in a full-duplex mode using a local access loop in accordance with the present invention.

FIG. 8 is a block diagram of one embodiment of a system for allocating bits to provide spectrally efficient transmission of information in a full-duplex mode using a local access loop in accordance with the present invention. The system (800) includes customer premises equipment (802) coupled to an intelligent services director (804) for multiplexing signals from said customer services equipment for transmission on at least one twisted pair coupled to a facilities management platform (806). Each facilities management platform (806) filters and separates voice signals from data packets and transmits said data packets to a network server platform/router (808) that is coupled to at least one communication network (810). Each facilities management platform (806) includes a data modulator (812) for allocating bits for spectrally efficient transmission in a full-duplex mode and a network server platform/router (808), and is functionally coupled to a plurality of facilities management platforms providing system management to the system (800). The data modulator (812) includes an allocation unit (814) coupled to a processor (816) and operates as described above.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method of allocating bits to sub-carriers of data channel frequencies for spectrally efficient full-duplex transmission between a central office (CO) and a remote terminal (RT), comprising the steps of:

measuring channel transfer functions from the CO to the RT, and from the RT to the CO, assuming a non-symmetric channel;

measuring a first noise background at the CO and a second noise background at the RT;

measuring a first effective echo cancellation at the CO and a second effective echo cancellation at the RT, including attenuation effect of an analog hybrid circuit;

allocating bits successively to a plurality of sub-carriers for a data channel based on a minimal joint power consumption at both the CO and RT, a joint power mask for each sub-carrier at both the CO and RT, a joint bit capacity of each sub-carrier at both the CO and RT, and a predetermined data rate; and ceasing allocation of bits when at least one of: a predetermined joint total power budget has been substantially exhausted, joint power masks for the plurality of sub-carriers have been substantially exhausted, and the predetermined data rate has been reached.

2. The method of claim 1 wherein allocating bits successively to the plurality of sub-carriers based on minimal joint power consumption at both the CO and RT comprises allocating a bit to an available sub-carrier having a lowest joint power requirement.

3. The method of claim 1 wherein allocating bits successively to the plurality of sub-carriers based on the joint power mask at both the CO and RT for each sub-carrier comprises allocating a bit to a sub-carrier when a total joint power utilized for the sub-carrier upon allocation of the bit fails to exceed the joint power mask for the sub-carrier.

4. The method of claim 1 wherein allocating bits successively to the plurality of sub-carriers based on a joint bit capacity of each sub-carrier comprises allocating bits to each sub-carrier based on a maximum number of bits and a minimum number of bits for each sub-carrier.

5. The method of claim 1 wherein ceasing allocation of bits when the predetermined total joint power budget has been substantially exhausted includes the steps of:
  calculating a total joint power level utilized as bits are allocated;
  comparing the total joint power level utilized to the predetermined total joint power budget;
  ceasing allocation of bits where a total joint power level utilized by bits allocated is less than the predetermined total joint power budget if allocation of another bit to a sub-carrier provides a total joint power level utilized by bits allocated that is greater than the predetermined total joint power budget.

6. The method of claim 1 wherein the joint power mask of each of the plurality of sub-carriers is a predetermined maximum joint power to be transmitted by the sub-carrier.

7. The method of claim 1 wherein a number of sub-carriers is 256 sub-carriers.

8. A method for allocating bits to provide spectrally efficient transmission of information bits in a full-duplex mode between a central office (CO) and a remote terminal (RT) using a local access loop, comprising the steps of:
  measuring channel transfer functions from the CO to the RT, and from the RT to the CO, assuming a non-symmetric channel;
  measuring a first effective echo cancellation at the CO and a second effective echo cancellation at the RT, including attenuation effect of an analog hybrid circuit;
  allocating bits successively to a plurality of sub-carriers for a data channel based on a minimal joint power consumption at both the CO and RT, a joint power mask for each sub-carrier at both the CO and RT, a joint bit capacity of each sub-carrier at both the CO and RT, and a predetermined data rate;
  determining whether: a predetermined joint total power budget has been substantially exhausted, joint power masks for the plurality of sub-carriers have been substantially exhausted, joint bit capacities for the plurality of sub-carriers have been substantially exhausted, and the predetermined data rate has been reached; and
  returning to allocating another bit to one of the plurality of sub-carriers unless at least one of: the predetermined joint total power budget has been substantially exhausted, joint power masks for the plurality of sub-carriers have been substantially exhausted, joint bit capacities for the plurality of sub-carriers have been substantially exhausted, or the predetermined data rate has been reached.

9. The method of claim 8 wherein allocating bits successively to the plurality of sub-carriers based on minimal joint power consumption comprises allocating a bit to an available sub-carrier having a lower joint power requirement.

10. The method of claim 8 wherein allocating bits successively to the plurality of sub-carriers based on the joint power mask for each sub-carrier comprises allocating a bit to a sub-carrier when a total joint power utilized for the sub-carrier upon allocation of the bit fails to exceed the joint power mask for the sub-carrier.

11. The method of claim 8 wherein allocating bits successively to the plurality of sub-carriers based on a bit capacity of each sub-carrier comprises allocating bits to each sub-carrier based on a maximum number of bits and a minimum number of bits for each sub-carrier.

12. The method of claim 8 wherein ceasing allocation of bits when the predetermined total joint power budget has been substantially exhausted includes the steps of:
  i) calculating a total joint power level utilized as bits are allocated;
  ii) comparing the total joint power level utilized to the predetermined total joint power budget;
  iii) ceasing allocation of bits where a total joint power level utilized by bits allocated is less than the predetermined total joint power budget if allocation of another bit to a sub-carrier provides a total joint power level utilized by bits allocated that is greater than the predetermined total joint power budget.

13. The method of claim 8 wherein the joint power mask of each of the plurality of sub-carriers is a predetermined maximum joint power to be transmitted by the sub-carrier.

14. The method of claim 8 wherein the plurality of sub-carriers includes 256 sub-carriers.

* * * * *